Nov. 9, 1954     E. W. CARR     2,693,825
GEAR-ACTUATED MAIN AND PILOT VALVE WITH DETENT
Filed July 14, 1951
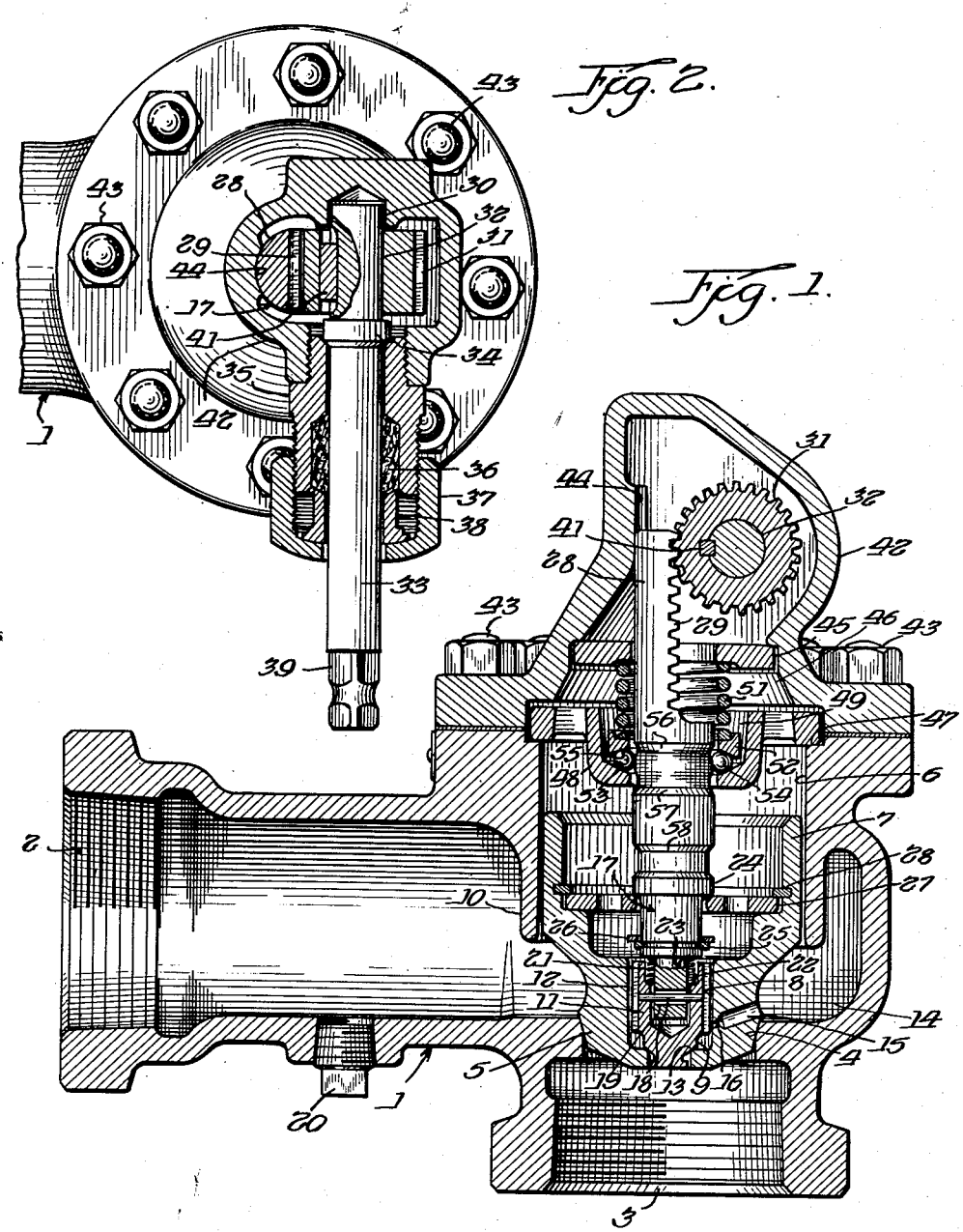

United States Patent Office 2,693,825
Patented Nov. 9, 1954

2,693,825

GEAR-ACTUATED MAIN AND PILOT VALVE WITH DETENT

Edward W. Carr, Chicago, Ill., assignor to Crane Co., Chicago, Ill., a corporation of Illinois Application July 14, 1951, Serial No. 236,805

3 Claims. (Cl. 137—630.15)

This invention relates to a valve. More particularly, it is concerned with a novel locomotive and car end steam valve, and constitutes an improvement over the valve actuating mechanism employed in the structure identified as Serial No. 178,642, filed August 10, 1950, now Patent No. 2,652,851 of September 22, 1953.

One of the more important objects of this invention lies in its provision of a valve in which a comparatively simple and inexpensive detent member may be employed which maintains the valve closure member in any one of three desired conditions, such as either closed, bleed, or fully open, and with the selection of each of such positions being dependent upon the operator's requirements.

Another object of this invention is to provide for a valve in which there is convenient and quick interchangeability with existing installations, and in which the operation and dimensional requirements make it relatively easy to apply the novel form of detent to the structure constituting a part of this invention.

As a matter of appreciating the substance of this invention, it should be understood that heretofore the type of detent used in valves of this type had required extra bolting with relatively expensive means for adjustment and which also required a special design of spring which was difficult to make and even more costly to install. In addition to this objection, field investigations have indicated that the previous structures which involved a gasketed cover plate joint also introduced leakage possibilities. Further, the life of the springs of the detent heretofore developed under test stood up for only relatively few number of operations, as, for example, of the order of only 17,000 to 20,000 operations. In contrast, in the instant invention, tests have shown that in twice the number of operations, there has been no sign of failure.

It is, therefore, another of the important objects of this invention to increase longevity and decrease manufacturing costs, while providing a compact unit within the limitations established and at the same time providing a relatively simple device.

As will hereinafter be more clearly evidenced in the description, another object of this invention is to provide a practical type of detent in a valve operator which also permits the use of a conventional form of helically wound compression spring, which is the most economical and most reliable of all springs tested. It has been found, for example, that in the variation in the angles against which the balls should respond, it is possible to operate the valve in one direction with relatively low resistance from the detent itself and have a high resistance in the opposite direction. It has also been found that this flexibility can be extended in order to obtain equal resistance in both directions, if necessary, for other valve applications.

In appraising the value of the present invention, it should be understood also that previously the effectiveness of a detent structure has been dependent upon the use of a large multiplicity of parts, as, for example, as many as thirteen, while in the type of structure constituting this invention, only five parts are required and these are relatively simple in shape, easy to form and assemble, and with the cost of the entire valve therefore appreciably lessened.

A further object of the invention lies in the provision of a stem detent structure having a spring loaded wedge mechanism with an annular angular contact face against which the ball bearings make intimate contact.

A still further object is to provide for a structure in which the gear and lock mechanism provides that the gear rack is integral with what is normally considered the stem of the valve, and it has grooves at such transverse planes at which it is desired to halt or inhibit valve motion. The depth of these grooves, their angle of inclination annularly, and the diameters of the balls forming the detent may be varied to provide any reasonable range of loading and, as will hereinafter be apparent, when the stem is axially moved, the detent balls snap into the grooves under the influence of the spring loaded inclines requiring only slight extra effort to cause the stems to be moved out of the grooved retained position.

Other objects and advantages will become more readily apparent upon proceeding with the specification read in light of the accompanying drawings, in which Fig. 1 is a sectional assembly view of a valve embodying my invention.

Fig. 2 is a fragmentary sectional view showing the lever operator in partial section.

Referring now to Fig. 1, a casing, generally designated 1, is of angular form and is provided with the usual inlet 2 and the outlet 3 with suitable means, such as the pipe threads, for connection to hose, piping, tubing, or the like. The casing is provided with the usual valve seat 4 against which the closure member 5 bears in pressure sealing relation. The closure member is preferably guided within the chamber 6 formed by the annular depending portion 10 of the casing by means of the enlarged cylindrical extension 7. The closure member 5 is provided with the lower cylindrical chamber 8 within which is a pilot disc 9 having an extension 11 with radially extending ribs 12 to allow for the passage of fluid past the pilot valve seat 13 when the pilot disc is actuated to relieve accumulations of condensate within the casing chamber 14 through the main valve closure passage or bleed 15, communicating with the chamber 8 by means of the reduced passage 16 connected to 15. The pilot disc 11 is attached to the stem, generally designated 17, by means of a pin 18 projecting through the apertured portion 19 of the lowermost end of the stem 17.

Generally for drain purposes, a plug 20 is employed. Preferably for cushioning purposes, a coil spring 21 may be interposed between the shoulder 22 of the pilot valve disc and the shoulder 23 of the stem 17. It will, of course, be apparent that the pilot valve closure member is limitedly movable reciprocally independently of the main valve closure member as hereinafter described. Such latter independent movement is provided by means of the shouldered section 24 and the split washer 25 supporting an annular member 26. Thus, it will be clear that the stem 17 is capable of relative longitudinal movement between the shoulder 24 and the washer 26 before the stem 17 moves a predetermined distance in its travel to cause the member 26 to bear against the perforated plate member 27, the latter member being held in fixed position by means of a split washer 28, placed in a groove within the closure member 5, as indicated.

Reciprocal movement of the stem 17 is effected by means of the stem rack portion 28 having the teeth 29 enmeshed with the gear teeth 31. The latter gear member is mounted on the shaft 32, as more clearly shown in Fig. 2, the shaft 32 having an extension 33 with the shoulder 34 held against axial movement by means of a conventional centerpiece 35 and in fluid sealing relation thereto by means of the packing 36, the stuffing nut 37, and the gland 38. At the extreme outer end of the extension 33, a polygonal portion 39 is provided for any suitable lever handle (not shown) to effect the desired rotation of the shaft 32, and to provide for nonrotatable relationship between the gear 31 and the shaft 32, a pin 41 is used.

The mounting for the stuffing box, stem, shaft, and gear includes a cover 42 held in any suitable manner, as, for example, by means of the bolt studs 43 to the valve casing 1.

In this type of construction, it has been found desirable to guide the combined stem and gear rack in a groove 44 to minimize the objectionable transverse effects of the various loads during the normal course of operation. It has also been found desirable to employ a retaining plate 45 in the upper end of the bonnet chamber 46, while at the lower end thereof and resting upon the shoulder 47 of the casing 1 a spider 48 is mounted having a chamber 49 within which a spring 51 is used to bear against the detent washer 52, the lower end of the chamber being defined by an annular inclined portion 53 upon which a plurality of annularly arranged ball bearings 54 are supported. The spring washer 52, at its lower portion 55, is also provided with an annular inclined surface, so that the balls 54 under the influence of the coil spring 51 normally are forced toward the annular surface 56 in the grooved stem thereby to hold the main valve and also the pilot valve in closed position, as indicated.

The stem 17 may be provided with a number of outer grooves 57 and 58 in different planes therein, depending upon the number of increments or spacing desired during the opening and closing range of movement of the valve. Thus, in the wide open position, and, as illustrated, the valve will be so maintained by the engagement of the ball bearings 54 with the groove 58.

In actual operation, it should be clear that in the first movement of the valve stem 17 upwardly, it will carry the pilot valve closure member 11 away from its seat 13 to allow for the initial or preliminary draining of fluids within the main valve closure member 5 and also from the chambers 6 and 14. The upper limits of the washer 26 will next contact the undersurface of the member 27 in the continued upward movement of the stem 17 to lift the main valve closure member from its contact with the casing seat 4 and thus allow for the disc to reach the limits of upper movement as established by the plane of the groove 58 in contacting and permitting the entry of the ball bearings 54.

It will be apparent that a relatively simple and economical detent actuating mechanism has been effected in a valve, but the particular form may be changed to suit a variety of conditions, and, therefore, the scope of this invention should be measured by the appended claims.

I claim:

1. The combination in a car end valve, a casing with a seat therein, a cover for the casing, a closure member within said casing cooperating with said seat and reciprocally movable relative to the said casing and guided by the latter, a combined gear and rack mechanism for actuating said closure member, a stem therefor cooperating with the rack, the said closure member having a pilot valve on said stem for permitting flow therethrough, a spring for the said pilot valve, the said pilot valve having means providing independent movement thereof resiliently upon predetermined axial movement of the said combined rack and stem, the said gear supported by the said cover being rotatably mounted to effect reciprocating movement of the rack and stem, resilient means interposed between the said cover and a fixed portion of the said casing to effect movement of the said stem toward and from the casing seat, the said latter means including a detent mounted on the interior of the said casing to engage in spaced depressions on the stem upon predetermined rotation of the said gear.

2. In a car end valve or the like, a casing with a valve seat, a cover for the casing, a closure member within said casing cooperating with said seat and reciprocally movable relative to the said casing and guided by a projecting portion of the latter, a combined gear and rack mechanism for actuating said closure member, a stem therefor cooperating with the rack, the said closure member having therewithin a pilot valve on said stem for permitting flow therethrough, a spring for the said pilot valve, the said pilot valve having means providing movement therefor upon predetermined axial movement of the said combined rack and stem, the said gear rotatably supported in the said cover to effect reciprocating movement of the said rack and stem, resilient means interposed between said cover and a fixed portion of the said casing to effect movement of the said stem toward and from the casing seat, the said latter means including a detent mounted on the interior of the said casing to engage spaced depressions on the stem upon predetermined axial movement of the said stem and rack.

3. The combination in a car end valve, a casing having a seat, a cover for the casing, a closure member within said casing reciprocally movable relative to the said seat and casing and guided by the latter, a combined rack and stem for actuating said closure member on the said stem, a gear for actuating said rack, the said closure member having a pilot valve on said stem for permitting flow through said closure member, a spring for the said pilot valve, the said pilot valve having means providing independent movement thereof resiliently upon predetermined axial movement of the said combined rack and stem, means interposed between the said cover and a fixed portion of the said casing to effect axial movement of the said stem toward and from the casing seat, the said latter means including a detent to engage in spaced depressions on the stem member upon predetermined movement of the said stem.

References Cited in the file of this patent

UNITED STATES PATENTS

| Number | Name | Date |
| --- | --- | --- |
| 311,833 | Hoxie | Feb. 3, 1885 |
| 1,624,130 | Beggs | Apr. 12, 1927 |
| 1,864,605 | McCarty | June 28, 1932 |
| 1,960,831 | Shand | May 29, 1934 |
| 2,329,182 | Boynton | Sept. 14, 1943 |
| 2,338,707 | Boynton | Jan. 11, 1944 |